United States Patent
Ishibashi

(10) Patent No.: US 9,218,577 B2
(45) Date of Patent: Dec. 22, 2015

(54) ELECTRIC POWER GENERATION AMOUNT ESTIMATION DEVICE, ELECTRIC POWER GENERATION AMOUNT ESTIMATION SYSTEM, ELECTRIC POWER GENERATION AMOUNT ESTIMATION METHOD AND COMPUTER PROGRAM

(75) Inventor: Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 574 days.

(21) Appl. No.: 12/952,865

(22) Filed: Nov. 23, 2010

(65) Prior Publication Data
US 2011/0137591 A1 Jun. 9, 2011

(30) Foreign Application Priority Data

Dec. 8, 2009 (JP) ................................. 2009-278788

(51) Int. Cl.
*G01R 21/00* (2006.01)
*G06Q 10/04* (2012.01)
*G06Q 50/06* (2012.01)
*H02J 3/38* (2006.01)
*H02J 3/00* (2006.01)

(52) U.S. Cl.
CPC ................ *G06Q 10/04* (2013.01); *G06Q 50/06* (2013.01); *H02J 3/383* (2013.01); *H02J 2003/007* (2013.01); *Y02E 10/563* (2013.01); *Y02E 60/76* (2013.01); *Y04S 40/22* (2013.01)

(58) Field of Classification Search
CPC .......... G06Q 10/04; G06Q 50/06; H02J 3/383
USPC .................... 702/60, 57, 61, 62, 64; 320/101; 136/243, 244, 290, 292, 293
See application file for complete search history.

(56) References Cited

U.S. PATENT DOCUMENTS

| | | | |
|---|---|---|---|
| 7,742,897 B2* | 6/2010 | Herzig ......................... | 702/182 |
| 7,747,598 B2 | 6/2010 | Buron et al. | |
| 8,019,117 B2* | 9/2011 | Sasakawa ..................... | 382/100 |
| 2002/0033020 A1* | 3/2002 | Tonomura et al. ........... | 60/641.8 |
| 2004/0167676 A1* | 8/2004 | Mizumaki ..................... | 700/286 |
| 2007/0198495 A1 | 8/2007 | Buron et al. | |
| 2008/0105045 A1* | 5/2008 | Woro ......................... | 73/170.27 |
| 2008/0154888 A1 | 6/2008 | Buron et al. | |
| 2009/0234692 A1* | 9/2009 | Powell et al. ..................... | 705/7 |
| 2010/0279455 A1* | 11/2010 | Seemann ........................ | 438/73 |
| 2012/0154162 A1* | 6/2012 | Vandevelde et al. .......... | 340/635 |

FOREIGN PATENT DOCUMENTS

| | | |
|---|---|---|
| JP | 2003-242232 A | 8/2003 |
| JP | 2006-33908 A | 2/2006 |
| JP | 2009-524893 | 7/2009 |

OTHER PUBLICATIONS

Office Action issued Aug. 6, 2013 in Japanese Patent Application No. 2009-278788.

* cited by examiner

*Primary Examiner* — Sujoy Kundu
*Assistant Examiner* — Ricky Ngon
(74) *Attorney, Agent, or Firm* — Hazuki International, LLC

(57) ABSTRACT

There is provided an electric power generation amount estimation device, including a solar power generation device identification portion that identifies a solar power generation device that generates electric power by receiving irradiation of sunlight, a sunlight amount calculation portion that estimates and calculates an amount of sunlight, and an electric power generation amount calculation portion that calculates an amount of electric power to be generated by the solar power generation device, based on information about the solar power generation device identified by the solar power generation device identification portion and about the amount of sunlight calculated by the sunlight amount calculation portion.

17 Claims, 7 Drawing Sheets

FIG. 6

PLEASE INPUT ESTIMATION TARGET DATE

___ MONTH ___ DAY

| 1 | 2 | 3 |
| 4 | 5 | 6 |
| 7 | 8 | 9 |
| * | 0 | # |

ESTIMATED AMOUNT OF ELECTRIC POWER TO BE GENERATED ON DECEMBER 20 IS

15kW

ELECTRIC POWER GENERATION AMOUNT ESTIMATION DEVICE, ELECTRIC POWER GENERATION AMOUNT ESTIMATION SYSTEM, ELECTRIC POWER GENERATION AMOUNT ESTIMATION METHOD AND COMPUTER PROGRAM

BACKGROUND OF THE INVENTION

1. Field of the Invention

The present invention relates to an electric power generation amount estimation device, an electric power generation amount estimation system, an electric power generation amount estimation method and a computer program.

2. Description of the Related Art

The use of renewable energy is being re-evaluated as a countermeasure against global warming, and distributed electric power generation using natural energies (for example, solar photovoltaic power generation, wind power generation, fuel cells, or biomass electric power generation) is being promoted. In order to reduce carbon dioxide emissions, particularly in Japan, solar photovoltaic power generation is intended to be widely used. For this reason, concrete measures and policies have been adopted. More specifically, the government provides grant money when a solar power generation device (for example, a solar panel including a solar cell) is installed in each household, or an electric power company buys surplus electric power. It is expected that solar panels will be installed in many households from now on.

However, one of the characteristics of electric power is that electric power cannot be stored. Therefore, buying surplus electric power from each household is a burden for the electric power company, and an electric power supply system becomes unstable. Accordingly, if solar panels are more widely used and a significant amount of surplus electric power is generated, it is expected that a balance between supply and demand of electric power may be disrupted and it may become difficult for the electric power company to buy surplus electric power. In addition, in solar photovoltaic power generation, the amount of generated electric power varies depending on the weather and installation conditions of each solar panel. Therefore, when electric power is bought from each household, the amount of generated electric power varies significantly. As a result, it is expected that a situation that cannot be handled by a transformer station may occur.

In order to effectively use surplus electric power generated by a solar panel, the following system can be used. A battery (a home battery) is prepared in each household and the surplus electric power generated by the solar panel is stored in the home battery. Then, the electric power stored in the home battery is used during a period of time in which the solar panel cannot generate electric power, such as during night hours, during cloudy weather etc. Further, a variety of methods have been devised. For example, the amount of electric power supplied from the electric power company is limited in accordance with a storage amount of the battery prepared in each household. As another example, electric power is supplied from the electric power company and is stored in the battery during the night time when the price is low, and the electric power stored in the battery is used during the daytime when the price is high. In addition, because the battery can store DC electric power without conversion, DC/AC conversion and AC/DC conversion that are performed when electric power is transmitted become unnecessary, thus achieving a reduction of loss due to conversion.

SUMMARY OF THE INVENTION

However, as described above, in solar photovoltaic power generation, the amount of generated electric power varies depending on the weather and the installation conditions of the solar panel. Therefore, in the current situation, there is no way to know how much amount of electric power the solar panel can generate daily (in the near future). It is possible to know the installation conditions of the solar panel using a three-dimensional map information service, as disclosed, for example, in Japanese Unexamined Patent Application Publication (Translation of PCT Application) No. 2009-524893. However, it is not possible to estimate the amount of electric power to be generated by the solar panel using only this information.

In addition, the amount of electric power generated by the solar cell also changes depending on the weather. Although the weather can be roughly ascertained by a weather forecast, an influence by objects that block sunlight, such as surrounding high-rise buildings and trees, is not taken into consideration at all. Therefore, when estimation is performed only using the weather forecast, the estimation of the amount of electric power to be generated by the solar cell is not performed accurately.

In light of the foregoing, it is desirable to provide an electric power generation amount estimation device, an electric power generation amount estimation system, an electric power generation amount estimation method and a computer program, that are novel and improved and that are capable of estimating a daily amount of electric power to be generated by a solar power generation device by using information relating to the solar power generation device.

According to an embodiment of the present invention, there is provided an electric power generation amount estimation device, including a solar power generation device identification portion that identifies a solar power generation device that generates electric power by receiving irradiation of sunlight, a sunlight amount calculation portion that estimates and calculates an amount of sunlight, and an electric power generation amount calculation portion that calculates an amount of electric power to be generated by the solar power generation device, based on information about the solar power generation device identified by the solar power generation device identification portion and about the amount of sunlight calculated by the sunlight amount calculation portion.

The electric power generation amount estimation device may further include a three-dimensional map information storage portion that stores information relating to installation conditions of the solar power generation device. The solar power generation device identification portion may identify the installation conditions of the solar power generation device based on the information stored in the three-dimensional map information storage portion, and the sunlight amount calculation portion may calculate the amount of sunlight based on the installation conditions of the solar power generation device identified by the solar power generation device identification portion.

The electric power generation amount calculation portion may calculate the amount of electric power to be generated by the solar power generation device, taking into consideration an orbit of the sun on an estimation target date.

The electric power generation amount calculation portion may calculate the amount of electric power to be generated by the solar power generation device, taking into consideration a condition of blocking sunlight to the solar power generation device, the blocking condition being derived from the orbit of the sun on the estimation target date and from the information stored in the three-dimensional map information storage portion, and changing due to the orbit of the sun.

The sunlight amount calculation portion may estimate and calculate the amount of sunlight based on information of a weather forecast.

When the sunlight amount calculation portion acquires a most recent weather forecast, the sunlight amount calculation portion may re-calculate the amount of sunlight based on the acquired weather forecast, and the electric power generation amount calculation portion may re-calculate, based on the re-calculated amount of sunlight, the amount of electric power to be generated.

The electric power generation amount calculation portion may calculate the amount of electric power to be generated, by performing multiplication using a power generation efficiency of the solar power generation device that is a calculation target of the amount of electric power to be generated.

The electric power generation amount calculation portion may calculate a total amount of electric power to be generated by solar power generation devices included in a predetermined area.

According to another embodiment of the present invention, there is provided an electric power generation amount estimation system, including a sunlight amount estimation device that estimates an amount of sunlight, and an electric power generation amount calculation device that calculates an amount of electric power to be generated by a solar power generation device that generates electric power by receiving irradiation of sunlight. The sunlight amount estimation device includes a sunlight amount calculation portion that estimates the amount of sunlight based on a command from the electric power generation amount calculation device, and transmits information about the estimated amount of sunlight to the electric power generation amount calculation device. The electric power generation amount calculation device includes a solar power generation device identification portion that identifies the solar power generation device, a sunlight amount estimation notification portion that notifies the sunlight amount estimation device of a command to estimate the amount of sunlight, and an electric power generation amount calculation portion that calculates the amount of electric power to be generated by the solar power generation device, based on information about the solar power generation device identified by the solar power generation device identification portion and about the amount of sunlight calculated by the sunlight amount calculation portion.

According to another embodiment of the present invention, there is provided an electric power generation amount estimation method, including the steps of identifying a solar power generation device that generates electric power by receiving irradiation of sunlight, estimating and calculating an amount of sunlight, and calculating an amount of electric power to be generated by the solar power generation device, based on information about the solar power generation device identified in the solar power generation device identifying step and about the amount of sunlight calculated in the sunlight amount calculating step.

According to another embodiment of the present invention, there is provided a computer program including instructions that command a computer to perform the steps of identifying a solar power generation device that generates electric power by receiving irradiation of sunlight, estimating and calculating an amount of sunlight, and calculating an amount of electric power to be generated by the solar power generation device, based on information about the solar power generation device identified in the solar power generation device identifying step and about the amount of sunlight calculated in the sunlight amount calculating step.

According to the present invention described above, it is possible to provide an electric power generation amount estimation device, an electric power generation amount estimation system, an electric power generation amount estimation method and a computer program, that are novel and improved and that are capable of estimating a daily amount of electric power to be generated by a solar power generation device by using information relating to the solar power generation device.

BRIEF DESCRIPTION OF THE DRAWINGS

FIG. 6 is an explanatory diagram showing an example of a screen displayed on a control panel 14; and FIG. 7 is an explanatory diagram showing an example of the screen displayed on the control panel 14.

DETAILED DESCRIPTION OF THE EMBODIMENT(S)

Figure 1:
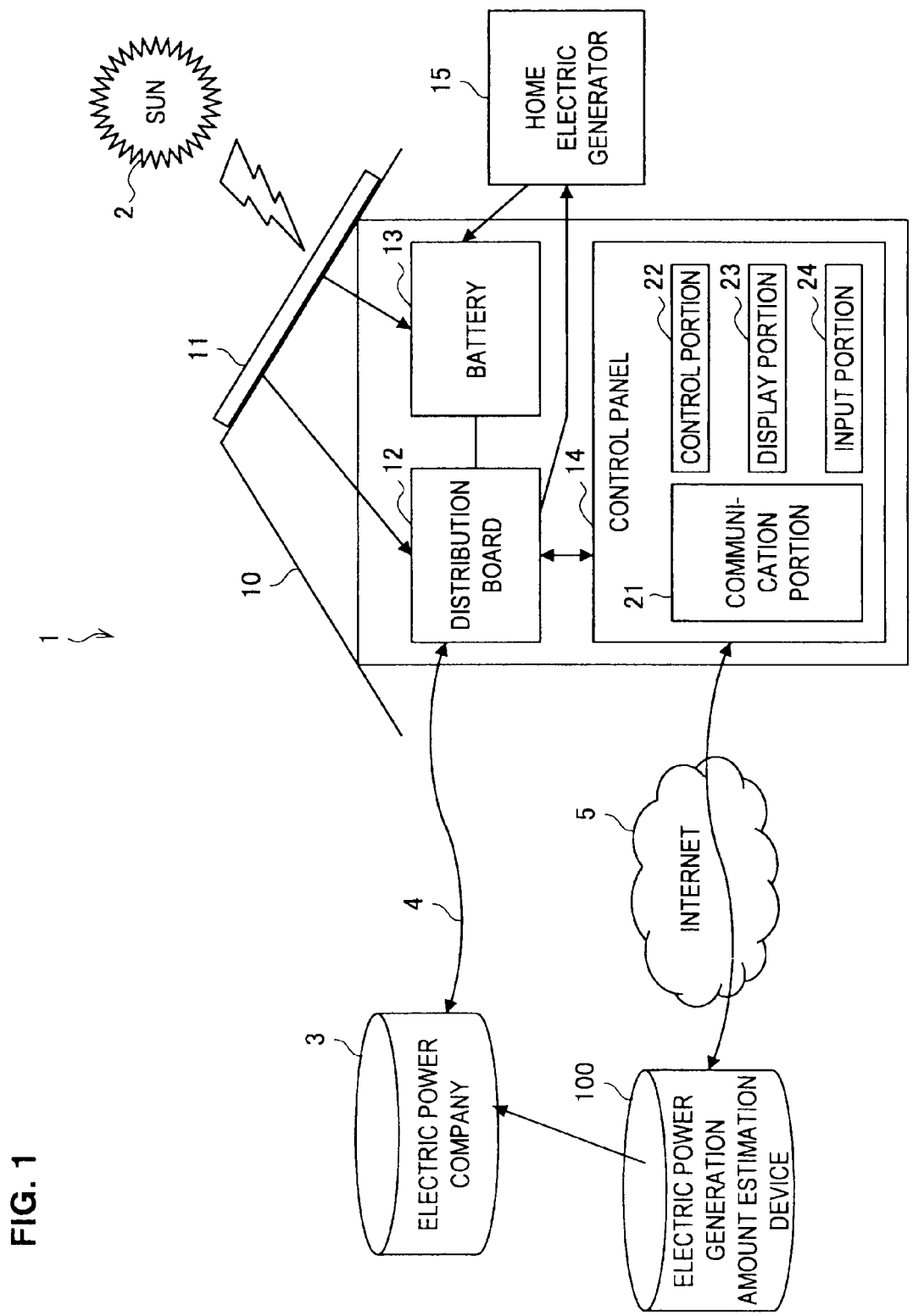
FIG. 1 is an explanatory diagram showing a schematic configuration of an electric power generation system using a solar power generation device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. First embodiment of the present invention
1-1. Schematic configuration of electric power generation system using solar power generation device
1-2. Configuration of electric power generation amount estimation device
1-3. Operation of electric power generation amount estimation device
1-4. Method for identifying solar power generation device
1-5. Display example of control panel
2. Conclusion
1. First embodiment of the present invention
1-1. Schematic configuration of electric power generation system using solar power generation device First, a schematic configuration of an electric power generation system 1 using a solar power generation device 11 according to an embodiment of the present invention will be described with reference to FIG. 1.

FIG. 1 is an explanatory diagram showing the schematic configuration of the electric power generation system 1 using the solar power generation device 11 according to the embodiment of the present invention. As shown in FIG. 1, the electric power generation system 1 according to the embodiment of the present invention includes the solar power generation device 11 that is mounted on a roof 10 of each household, a distribution board 12, a battery 13, a control panel 14, a home electric generator 15 and an electric power generation amount estimation device 100.

The solar power generation device 11 is a device provided with a solar cell, and it generates electric power using photovoltaic power generated by receiving irradiation of sunlight from a Sun 2. The electric power generated by the solar power generation device 11 is supplied to each of electric devices in the household via the distribution board 12. Further, when each of the electric devices in the household does not require electric power, it is supplied to the battery 13 and used for charging the battery 13.

The distribution board 12 controls supply of electric power to each of the electric devices in the household. In the present embodiment, when surplus electric power is generated in the electric power generated by the solar power generation device 11, the distribution board 12 serves to supply the surplus electric power to the battery 13 or sell the surplus electric power to an electric power company.

The battery 13 stores electric power. The electric power stored in the battery 13 may be electric power that is generated by the solar power generation device 11, may be electric power that is generated by the home electric generator 15, or may be electric power that is generated by an electric power company 3 and is supplied via an electric wire 4. Note that the battery 13 may be any device as long as it can store energy in some form and can discharge it again. For example, a storage battery is a device that directly stores electric energy and its examples include a lithium ion battery, a nickel hydride battery, a lead storage battery, an NAS battery (a sodium-sulfur battery) and the like. The storage battery is not limited to a storage battery that is currently available, and it may be any storage battery that will be available in the future. In addition, not only the storage battery, but also a large capacity capacitor, as represented by an electric double-layer capacitor, may be used as a device that stores electric energy.

In the electric power generation system 1 according to the present embodiment, each of the devices in the household basically operates by the electric power generated by the solar power generation device 11. When the electric power that exceeds the electric power that can operate each of the devices in the household is generated by the solar power generation device 11, the surplus electric power generated by the solar power generation device 11 is used to charge the battery 13 via the distribution board 12.

The control panel 14 controls an operation of each of the devices in the household and communicates with the electric power generation amount estimation device 100 that is provided outside the household. An estimated amount of electric power to be generated by the solar power generation device 11 can be acquired by performing communication between the control panel 14 and the electric power generation amount estimation device 100. As shown in FIG. 1, the control panel 14 includes a communication portion 21, a control portion 22, a display portion 23 and an input portion 24. The communication portion 21 performs communication between the control panel 14 and the electric power generation amount estimation device 100 via an Internet 5. The control portion 22 controls an operation of the control panel 14. For example, the control portion 22 controls display on the display portion 23, and performs processing in accordance with an input by a user on the input portion 24. The display portion 23 displays various types of information relating to the electric power generation system 1. For example, the display portion 23 may display, as various types of information relating to the electric power generation system 1, information such as a current amount of electric power generated by the solar power generation device 11, an estimated amount of electric power that will be generated by the solar power generation device 11 in the future, a charge amount of the battery 13, and the like. The input portion 24 receives various input operations performed by the user on the control panel 14. For example, the input portion 24 may be used to input a command to start estimation processing of the amount of electric power to be generated, which is performed using the electric power generation amount estimation device 100, and a command to charge or discharge the battery 13.

Note that, although not shown in FIG. 1, an information processing device such as a personal computer may be connected to the control panel 14, and the operation of the control panel 14 may be controlled using the information processing device. Alternatively, the information processing device may be used in place of the control panel 14.

The home electric generator 15 is provided to each household by a gas company, for example. When the gas company provides the home electric generator 15 to each household, the home electric generator 15 is a device that generates electric power using gas, and it can supply electric power to each of the electric devices in the household without receiving the supply of electric power from the electric power company. Note that the home electric generator 15 is provided by a contract with each household, and provision of the home electric generator 15 is not essential in the present invention.

The electric power generation amount estimation device 100 is a device that estimates the amount of electric power to be generated by the solar power generation device 11. More specifically, the electric power generation amount estimation device 100 estimates the amount of electric power to be generated by the solar power generation device 11 on an estimation target date, using information such as installation conditions of the solar power generation device 11, the weather forecast for the estimation target date, and the like. If the estimated amount of electric power to be generated by the solar power generation device 11 is calculated using the electric power generation amount estimation device 100, the user of the solar power generation device 11 can make an electric power selling plan for the electric power generated by the solar power generation device 11. Further, when the electric power generated by the solar power generation device 11 is not enough to satisfy an electric power demand, the user can make use of electric power generated by the home electric generator 15 if the home electric generator 15 is provided. The configuration of the electric power generation amount estimation device 100, and the estimation processing that is performed by the electric power generation amount estimation device 100 in order to estimate the amount of electric power to be generated by the solar power generation device 11 will be described in detail later.

The control panel 14 is used to issue, from the household to the electric power generation amount estimation device 100, a command to start the estimation processing of the amount of electric power to be generated by the solar power generation device 11. When the electric power generation amount estimation device 100 receives the command from the control panel 14, it performs the estimation processing of the amount of electric power to be generated by the solar power generation device 11, based on the information transmitted from the control panel 14. Then, the electric power generation amount estimation device 100 transmits to the control panel 14 information about the estimated amount of electric power to be generated. When the control panel 14 receives from the electric power generation amount estimation device 100 the information about the estimated amount of electric power to be generated, it displays the information on the display portion 23. Thus, the control panel 14 can notify the user of the information about the estimated amount of electric power to be generated by the solar power generation device 11.

The schematic configuration of the electric power generation system 1 using the solar power generation device 11 according to the embodiment of the present invention is described above. Next, a configuration of the electric power generation amount estimation device 100 according to the embodiment of the present invention will be described.

1-2. Configuration of electric power generation amount estimation device

Figure 2:
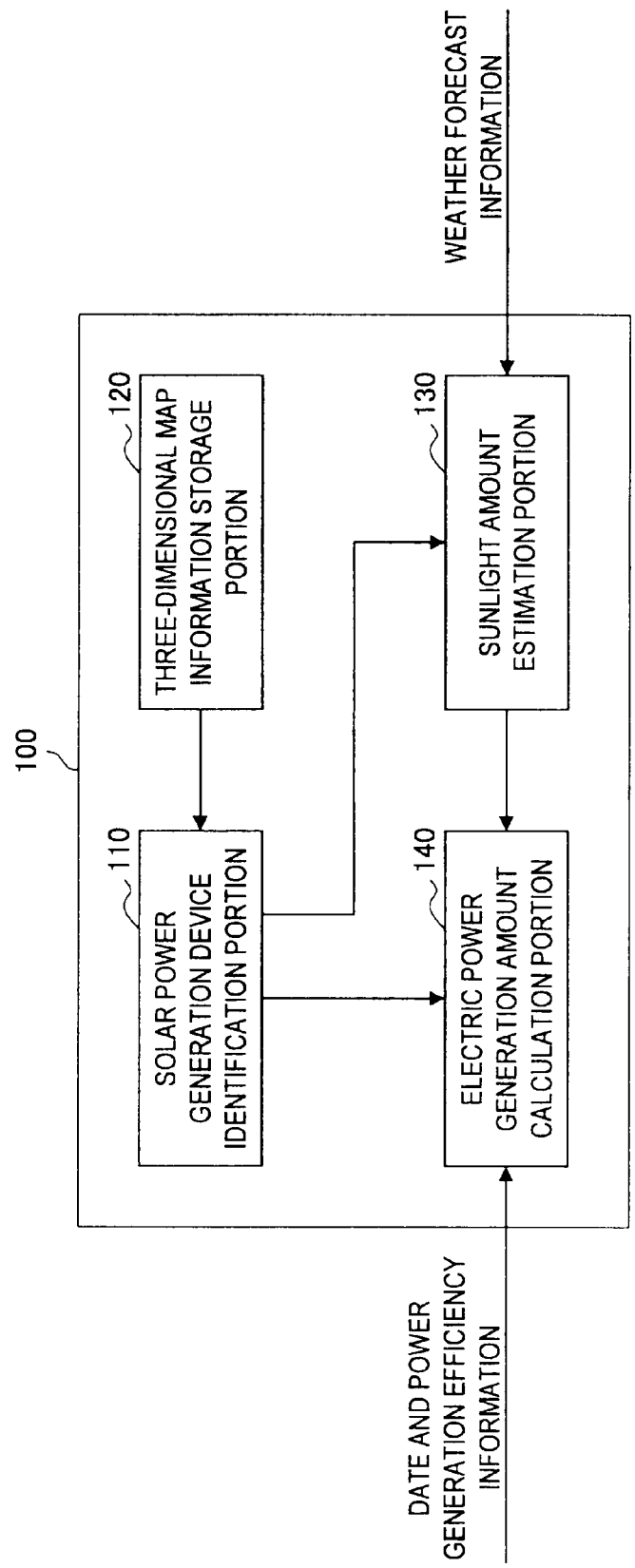
FIG. 2 is an explanatory diagram showing a configuration of an electric power generation amount estimation device 100 according to the embodiment of the present invention.

FIG. 2 is an explanatory diagram showing the configuration of the electric power generation amount estimation device 100 according to the embodiment of the present invention. Hereinafter, the configuration of the electric power generation amount estimation device 100 according to the embodiment of the present invention will be described with reference to FIG. 2.

As shown in FIG. 2, the electric power generation amount estimation device 100 according to the embodiment of the present invention includes a solar power generation device identification portion 110, a three-dimensional map information storage portion 120, a sunlight amount estimation portion 130 and an electric power generation amount calculation portion 140.

The solar power generation device identification portion 110 identifies the position of the solar power generation device that is used as an estimation target (hereinafter referred to as the estimation target solar power generation device), based on the command from the control panel 14 to start the estimation processing to estimate the amount of electric power generation. More specifically, the solar power generation device identification portion 110 refers to three-dimensional map information stored in the three-dimensional map information storage portion 120, and thereby identifies the installation conditions of the estimation target solar power generation device used to estimate the amount of electric power generation. The installation conditions of the solar power generation device include information such as, for example, the latitude and longitude of the solar power generation device that is installed on the roof, an installation height and an installation angle of the solar power generation device, a surface area of the solar power generation device, and sunlight blocking conditions caused by buildings and trees etc. located around the solar power generation device.

The three-dimensional map information storage portion 120 stores the three-dimensional map information. Specifically, the three-dimensional map information stored in the three-dimensional map information storage portion 120 is created from satellite images, or images that are captured by a camera mounted on a vehicle running on a road. A known technology can be used as a method for creating the three-dimensional map information, and a detailed explanation is therefore omitted here. If the solar power generation device identification portion 110 refers to the three-dimensional map information stored in the three-dimensional map information storage portion 120, the solar power generation device identification portion 110 can identify the installation conditions of the estimation target solar power generation device used to estimate the amount of electric power generation.

The sunlight amount estimation portion 130 estimates the amount of sunlight in the position of the estimation target solar power generation device on the estimation target date. When estimating the amount of sunlight, the sunlight amount estimation portion 130 uses the position and the installation conditions of the estimation target solar power generation device, the orbit of the sun on the estimation target date, and the weather forecast on the estimation target date, more specifically, information about sunshine hours. If the position of the estimation target solar power generation device is ascertained, the orbit of the sun in that position and on the estimation target date is also determined. Further, if the installation conditions of the estimation target solar power generation device are ascertained, conditions causing blocking of sunlight from the sun on the estimation target date are also determined. The conditions causing blocking of sunlight from the sun indicate conditions in which sunlight is blocked from reaching the solar panel by surrounding high-rise buildings and utility poles, for example. Therefore, if the position and the installation conditions of the estimation target solar power generation device and the orbit of the sun on the estimation target date are determined, it is possible to estimate and calculate a maximum amount of electric power to be generated by the estimation target solar power generation device on the estimation target date. In addition to this, if the information about sunshine hours on the estimation target date is taken into consideration, it is possible to estimate and calculate the amount of electric power to be generated by the estimation target solar power generation device on the estimation target date. Note that, it is described here that the amount of electric power to be generated is estimated by simply taking sunshine hours etc. into consideration. To be more specific, occurrence of clouds is estimated from the weather forecast at a certain time interval (for example, at a ten-minute interval), and based on this, the amount of sunlight irradiating the solar power generation device is estimated, thereby calculating irradiation time information. For example, when only fifty percent of a maximum illuminance is obtained due to the occurrence of clouds, an irradiation time at this point in time is calculated to be fifty percent. Thus, information can be provided by converting to the irradiation time. Of course, it is possible to provide total irradiation amount information. However, in the present embodiment, the explanation is given by converting to the irradiation time.

The electric power generation amount calculation portion 140 estimates and calculates the amount of electric power to be generated by the estimation target solar power generation device on the estimation target date, using the position of the estimation target solar power generation device that is identified by the solar power generation device identification portion 110, and the amount of sunlight in the position of the estimation target solar power generation device on the estimation target date, the amount of sunlight being estimated by the sunlight amount estimation portion 130. As described above, if the position and the installation conditions of the estimation target solar power generation device and the orbit of the sun on the estimation target date are determined, it is possible to estimate and calculate the maximum amount of electric power to be generated by the estimation target solar power generation device on the estimation target date. Further, if the information about sunshine hours on the estimation target date is taken into consideration, it is possible to estimate and calculate the amount of electric power to be generated by the estimation target solar power generation device on the estimation target date. The electric power generation amount calculation portion 140 acquires, from the solar power generation device identification portion 110, information about the position of the estimation target solar power generation device, and acquires, from the sunlight amount estimation portion 130, information about the amount of sunlight in the position of the estimation target solar power generation device on the estimation target date. By using these pieces of information, the electric power generation amount calculation portion 140 can estimate and calculate the amount of electric power to be generated by the estimation target solar power generation device on the estimation target date.

Note that, although FIG. 2 shows the configuration in which the three-dimensional map information storage portion 120 is included inside the electric power generation amount estimation device 100, the present invention is not limited to this example. The three-dimensional map information storage portion 120 that stores three-dimensional map information may be provided on the outside of the electric power generation amount estimation device 100 that estimates the amount of electric power to be generated.

The configuration of the electric power generation amount estimation device 100 according to the embodiment of the present invention is described above with reference to FIG. 2. Next, an operation of the electric power generation amount estimation device 100 according to the embodiment of the present invention will be described.

1-3. Operation of electric power generation amount estimation device

Figure 3:
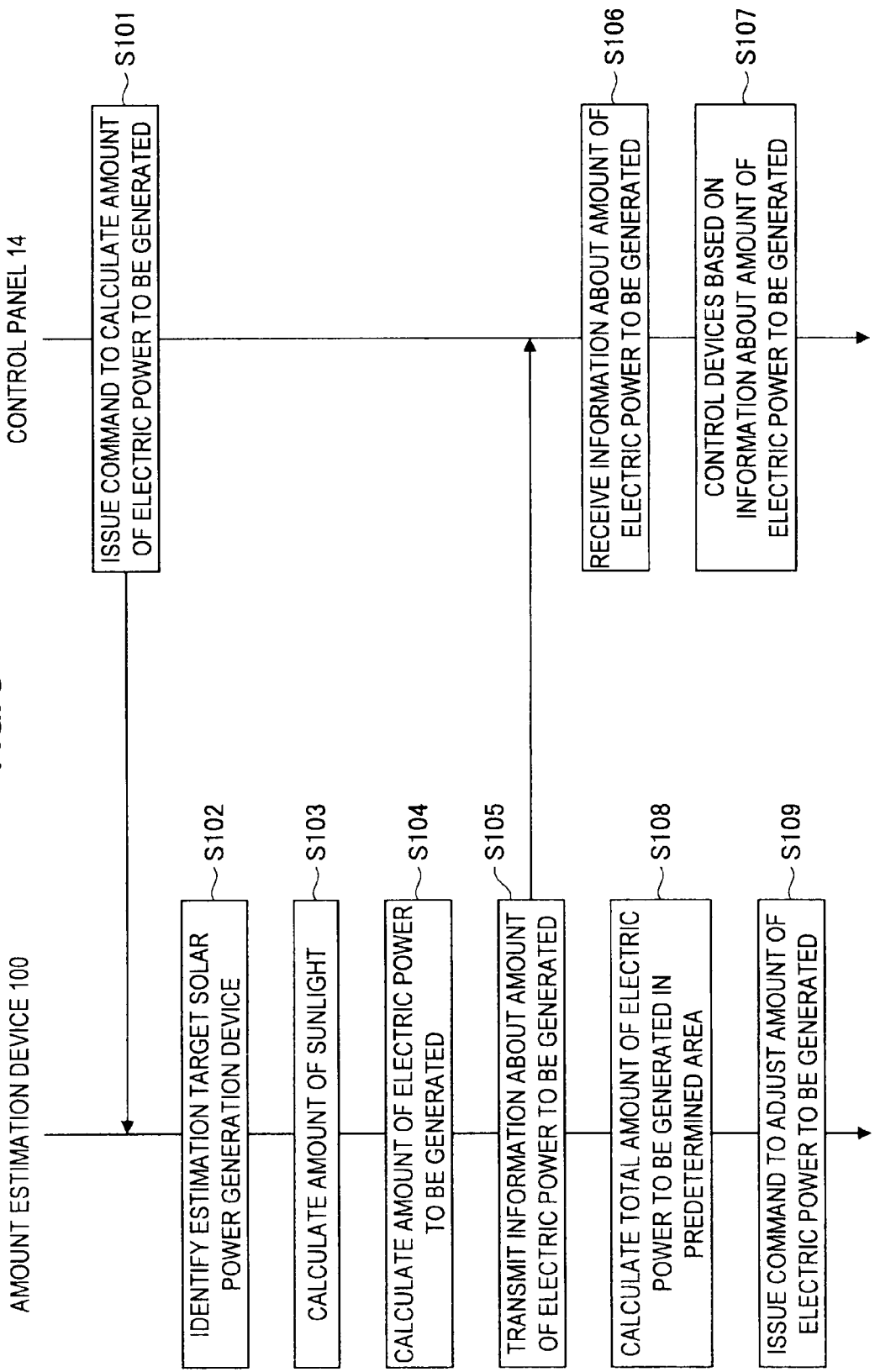
FIG. 3 is a flowchart showing an operation of the electric power generation amount estimation device 100 according to the embodiment of the present invention.

FIG. 3 is a flowchart showing the operation of the electric power generation amount estimation device 100 according to the embodiment of the present invention. FIG. 3 also shows an operation of the control panel 14 that operates in conjunction with the electric power generation amount estimation device 100, along with the operation of the electric power generation amount estimation device 100. Hereinafter the operation of the electric power generation amount estimation device 100 according to the embodiment of the present invention will be described with reference to FIG. 3.

In order to estimate the amount of electric power to be generated by the solar power generation device 11 using the electric power generation amount estimation device 100 according to the embodiment of the present invention, for example, the user operates the control panel 14 provided in the household, and commands the electric power generation amount estimation device 100 to estimate the amount of electric power to be generated (step S101). Note that, when the user operates the control panel 14 and commands the electric power generation amount estimation device 100 to estimate the amount of electric power to be generated, the user may also specify a future estimation target date. The control panel 14 detects the user operation using the control portion 22, and commands the electric power generation amount estimation device 100 to calculate the amount of electric power to be generated by the solar power generation device 11, from the control portion 22 via the communication portion 21. When the electric power generation amount estimation device 100 receives the command from the control panel 14, the solar power generation device identification portion 110 of the electric power generation amount estimation device 100 first identifies the estimation target solar power generation device based on the command from the control panel 14 (step S102). In order to identify the estimation target solar power generation device by the solar power generation device identification portion 110, information about the address of the house on which the solar power generation device 11 is installed and information to identify the solar power generation device 11, for example, may be transmitted from the control panel 14.

Note that, in the present invention, a technique to identify the solar power generation device is not limited to this example. For example, the solar power generation device may be identified by the user specifying the estimation target solar power generation device from the three-dimensional map information stored in the three-dimensional map information storage portion 120. When the three-dimensional map information stored in the three-dimensional map information storage portion 120 is used to identify the solar power generation device, the user may access the electric power generation amount estimation device 100 from the household using an information processing device such as a personal computer, and may display on the information processing device the three-dimensional map information stored in the three-dimensional map information storage portion 120. Then, the user may specify the estimation target solar power generation device from the displayed three-dimensional map information.

Further, in the present invention, when the electric power generation amount estimation device 100 calculates the amount of electric power to be generated by the solar power generation device 11, information about power generation efficiency of the solar power generation device may be transmitted as the information that is transmitted to the electric power generation amount estimation device 100. The power generation efficiency of the solar power generation device is calculated by taking deterioration over time of the solar power generation device into consideration. Information that is manually input by the user or information that is automatically set in accordance with the number of days from the installation date may be used as the information about the power generation efficiency of the solar power generation device. Alternatively, an actual value of the amount of electric power generation and an actual value of the amount of sunlight that are obtained through an electric power generation amount estimation operation (which will be described later) may be used to re-calculate the power generation efficiency on a daily basis.

After the solar power generation device identification portion 110 identifies the estimation target solar power generation device, the sunlight amount estimation portion 130 then estimates the amount of sunlight in the position of the estimation target solar power generation device on the estimation target date (step S103). As described above, when estimating the amount of sunlight, the sunlight amount estimation portion 130 uses the position and the installation conditions of the estimation target solar power generation device identified at the above-described step S102, the orbit of the sun on the estimation target date, and the weather forecast on the estimation target date, more specifically, information about sunshine hours. The installation conditions of the estimation target solar power generation device identified at the above-described step S102, namely, the installation angle of the solar power generation device, the condition of sunlight blocking objects located around the solar power generation device, and the like can be acquired from the three-dimensional map information stored in the three-dimensional map information storage portion 120.

A calculation to estimate the amount of sunlight can be performed by the sunlight amount estimation portion 130 based on weather forecast information, using a method in which the amount of sunlight corresponding to ten minutes is calculated every ten minutes, for example. In a case where the amount of sunlight corresponding to ten minutes is calculated every ten minutes, supposing that there is no movement of clouds and no movement of the sun during this time period, it may be assumed that the solar power generation device is irradiated for ten minutes with illuminance at the time of the calculation and the solar power generation device generates electric power based on the illuminance and the irradiation time.

After the sunlight amount estimation portion 130 estimates the amount of sunlight in the position of the estimation target solar power generation device on the estimation target date at the above-described step S103, the electric power generation amount calculation portion 140 then estimates and calculates the amount of electric power to be generated by the estimation target solar power generation device on the estimation target date, using the position of the estimation target solar power generation device identified by the solar power generation device identification portion 110, and the amount of sunlight in the position of the estimation target solar power generation device on the estimation target date, the amount of sunlight being estimated by the sunlight amount estimation portion 130 (step S104). Note that, when the amount of electric power generation is estimated at step S104, if the information about the power generation efficiency has already been transmitted to the electric power generation amount estimation device 100, the electric power generation amount calculation portion 140 estimates and calculates the amount of electric power to be generated by the estimation target solar power generation device on the aforementioned date, taking the information about the power generation efficiency into consideration (i.e., performing multiplication using the power generation efficiency). On the other hand, if the information about the power generation efficiency has not been transmitted to the electric power generation amount estimation device 100, it is also possible that only the total amount of irradiation is calculated in the electric power generation amount estimation device 100, and an actual calculation to estimate the amount of electric power generation is performed by the control portion 22 of the control panel 14. Note that the shape etc. of the solar power generation device is not described in the present embodiment. However, it is assumed that, when the amount of sunlight is calculated, the shape of the solar power generation device is determined from the above-described three-dimensional map information and the amount of irradiation that reaches a solar panel of that shape is calculated.

After the electric power generation amount calculation portion 140 estimates and calculates the amount of electric power to be generated by the estimation target solar power generation device at the above-described step S104, the electric power generation amount estimation device 100 transmits to the control panel 14 information about the estimated amount of electric power to be generated on the estimation target date, as calculated by the electric power generation amount calculation portion 140 (step S105). The control panel 14 receives the information about the estimated amount of electric power to be generated on the estimation target date (step S106), and controls the devices in the household based on the received information about the estimated amount of electric power to be generated (step S107).

Further, the electric power generation amount calculation portion 140 of the electric power generation amount estimation device 100 can estimate and calculate the amount of electric power to be generated by the solar power generation devices in a predetermined area (step S108). By estimating and calculating the amount of electric power to be generated by the solar power generation devices in the predetermined area, the electric power generation amount estimation device 100 can ascertain variations in the amount of electric power to be generated in the predetermined area. After estimating and calculating the amount of electric power to be generated by the solar power generation devices in the predetermined area at the above-described step S108, the electric power generation amount estimation device 100 can provide information about the calculated amount of electric power to be generated by the solar power generation devices in the predetermined area to the electric power company 3, for example, and can issue a command to adjust the amount of electric power to be generated (step S109).

In this manner, in the electric power generation amount estimation device 100, the position of the estimation target solar power generation device used to estimate the amount of electric power generation is identified, and the amount of sunlight in the position of the solar power generation device on the estimation target date is calculated based on the position and the installation conditions of the identified solar power generation device. Thus, it is possible to estimate and calculate the amount of electric power to be generated by the solar power generation device. Further, the electric power generation amount estimation device 100 calculates the sum of the estimated amounts of electric power to be generated by the solar power generation devices in the predetermined area, thus enabling estimation of the amount of electric power to be generated by the solar power generation devices in the predetermined area.

Further, each household receives information about the amount of electric power to be generated by the solar power generation device that is estimated by the electric power generation amount estimation device 100. Therefore, each household can perform control relating to an electric power selling plan for the electric power that is generated by the solar power generation device 11 and stored in the battery 13, or relating to operations associated with another electric power generation device (for example, the home electric generator 15) that is provided in each household. For example, if a few days later, it is expected that only a small amount of electric power will be generated by the solar power generation device 11 because of bad weather, control can be performed such that the generation of electric power by the home electric generator 15 is increased. If a few days later, it is expected that a considerable amount of electric power will be generated by the solar power generation device 11 because of good weather, control can be performed such that the generation of electric power by the home electric generator 15 is not performed, or such that the electric power generated by the solar power generation device 11 is stored in the battery 13.

Note that, even when the electric power generation amount estimation device 100 estimates and calculates the amount of electric power to be generated by the solar power generation device, a case may occur in which it is necessary to re-calculate the estimated amount of electric power to be generated, which has been calculated once. In this case, the estimated amount of electric power to be generated, which has been calculated once, may be re-calculated, for example, at a timing at which a command to re-calculate the estimated amount of electric power to be generated is transmitted from the user using the control panel 14, or at a timing at which the most recent weather forecast is transmitted to the electric power generation amount estimation device 100 from the Meteorological Office, a private weather service company or the like. Then, the estimated amount of electric power to be generated, which has been re-calculated, may be transmitted to the control panel 14 or the like.

1-4. Method for identifying solar power generation device

Figure 4:
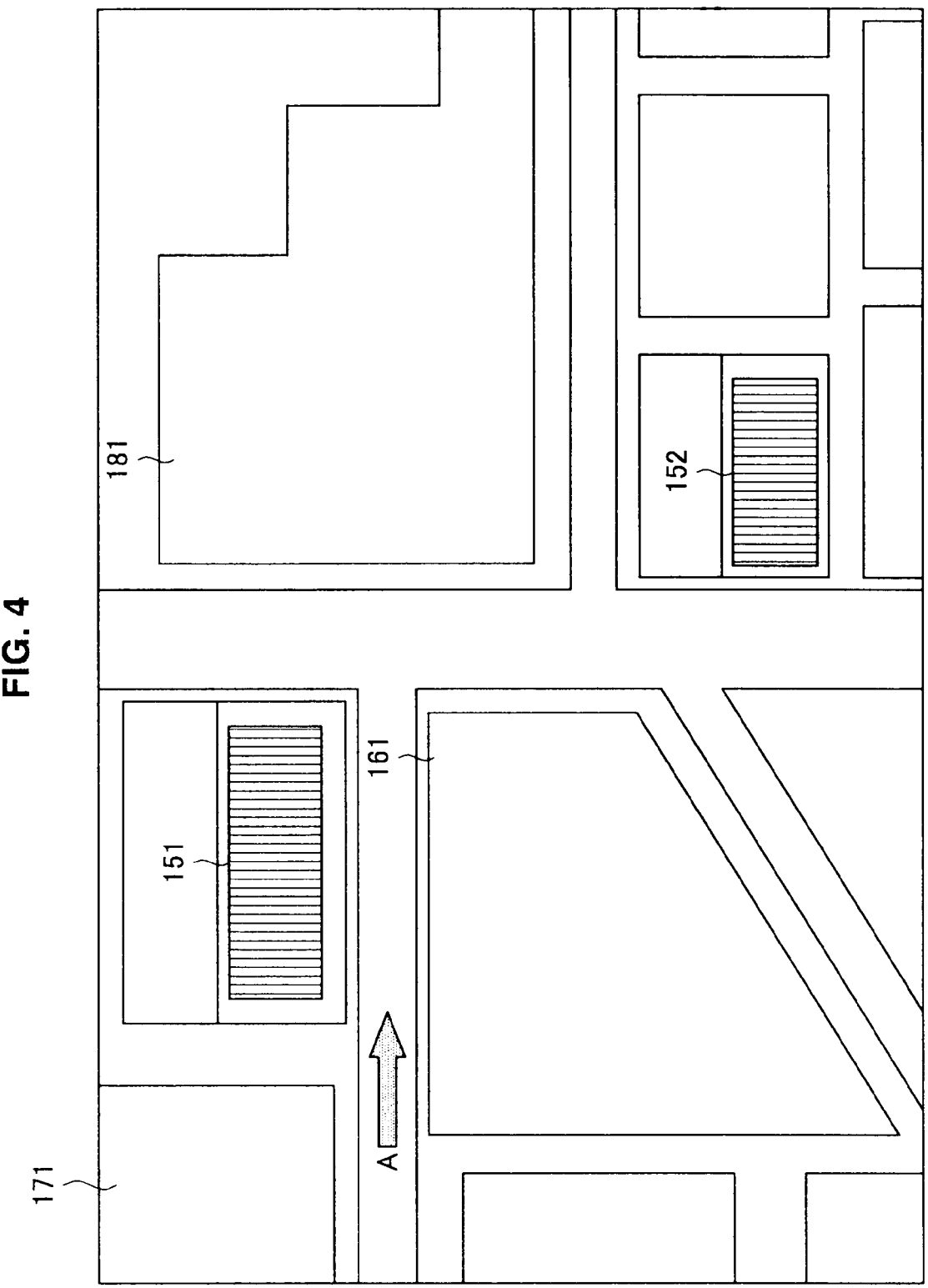
FIG. 4 is an explanatory diagram showing an example of three-dimensional map information stored in a three-dimensional map information storage portion 120.
Figure 5:
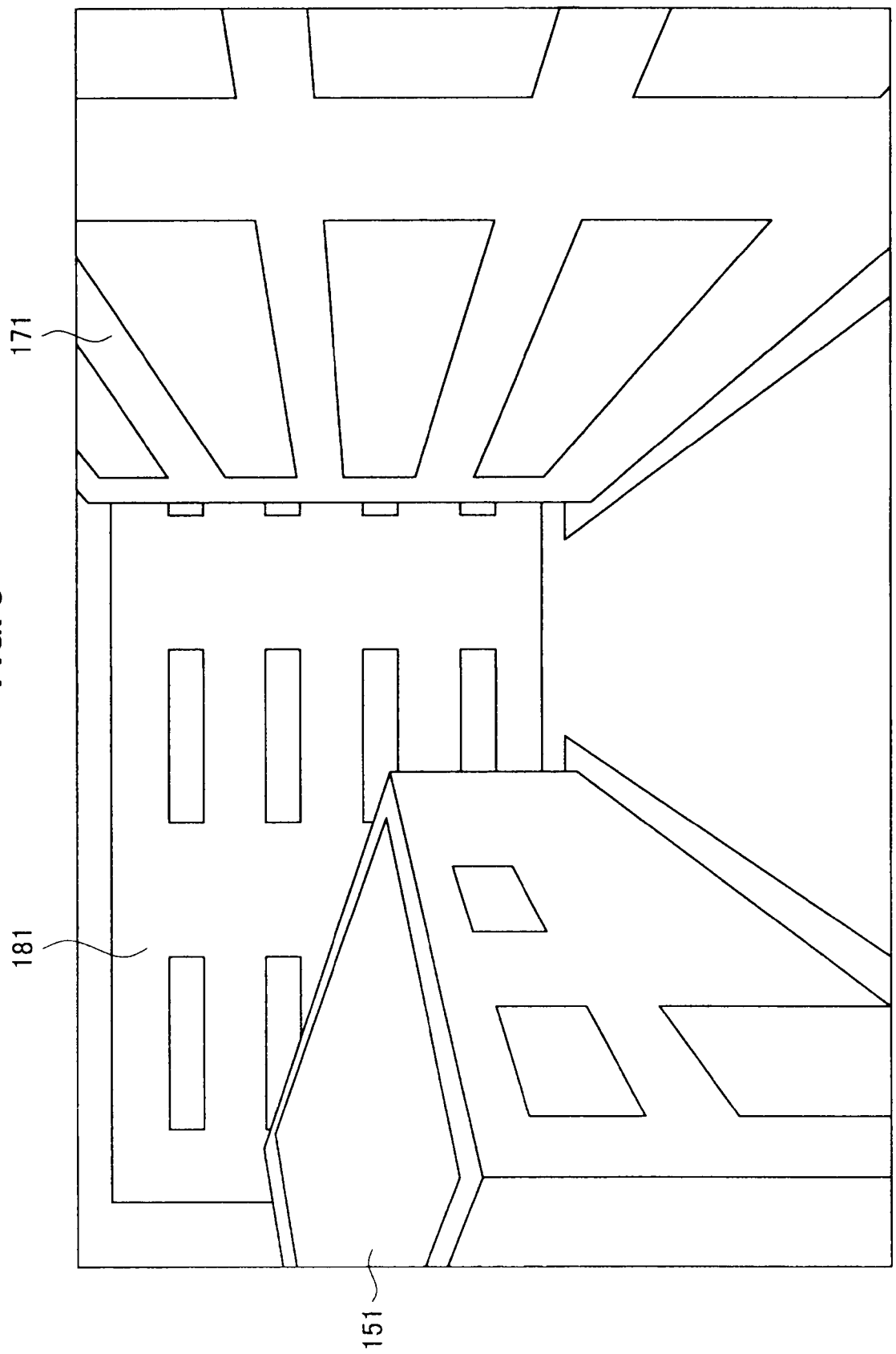
FIG. 5 is an explanatory diagram showing an example of three-dimensional map information stored in the three-dimensional map information storage portion 120.

A method for identifying the solar power generation device from the three-dimensional map information stored in the three-dimensional map information storage portion 120 will now be described. FIG. 4 and FIG. 5 are explanatory diagrams each showing an example of the three-dimensional map information stored in the three-dimensional map information storage portion 120.

FIG. 4 shows an example of the three-dimensional map information that is created from a satellite photo taken from the sky. FIG. 5 shows an example of the three-dimensional map information that is created from an image that is captured by a camera mounted on a vehicle running on a road.

In the three-dimensional map information shown in FIG. 4, the reference numerals 151 and 152 correspond to solar power generation devices installed on the roofs. If the solar power generation device 151 is taken as an example for explanation, there are buildings denoted by the reference numerals 161, 171 and 181 around the solar power generation device 151. There are cases in which irradiation of sunlight to the solar power generation device 151 is blocked by these buildings, depending on the orbit of the sun, which changes as the seasons change. However, the heights of the buildings 161, 171 and 181 are not confirmed only by the map information shown in FIG. 4. Therefore, when the electric power generation amount estimation device 100 estimates the amount of electric power to be generated by the solar power generation device 151, it uses the map information shown in FIG. 5 in order to obtain information about the heights of the buildings 161, 171 and 181.

The three-dimensional map information shown in FIG. 5 shows an example of the three-dimensional map information that is created from the image captured from a point A in FIG. 4 in the direction of an arrow. In FIG. 5, the buildings 171 and 181 located around the solar power generation device 151 are also shown. From the three-dimensional map information shown in FIG. 5, it is possible to obtain approximate height information of the buildings 171 and 181.

Therefore, when the amount of electric power to be generated by the solar power generation device 151 is estimated by the electric power generation amount estimation device 100, if the three-dimensional map information stored in the three-dimensional map information storage portion 120 is used, information about an environment around the solar power generation device 151, namely, information about the heights of the buildings 161, 171 and 181 can be obtained. Further, by obtaining the information about the environment around the solar power generation device 151, it is possible to improve accuracy of the estimated amount of electric power to be generated by the solar power generation device 151.

Note that, an object that is thought to be a solar power generation device may be extracted from the three-dimensional map information shown in FIG. 4 through image recognition processing, and thus the position of the solar power generation device may be obtained automatically. For example, an object that matches a predetermined color, shape and size may be extracted as a solar power generation device from the three-dimensional map information. In the example of the three-dimensional map information shown in FIG. 4, rectangles denoted by the reference numerals 151 and 152 can be extracted as solar power generation devices through the image recognition processing.

As described above, if the solar power generation device identification portion 110 identifies the solar power generation device from the three-dimensional map information such as that shown in FIG. 4 and FIG. 5, it is possible to acquire the position of the solar power generation device and the installation conditions of the solar power generation device from the three-dimensional map information. Then, by using the thus acquired information about the position of the solar power generation device and the installation conditions of the solar power generation device, a more accurate calculation of the amount of electric power generation becomes possible.

1-5. Display example of control panel

FIG. 6 and FIG. 7 are diagrams each showing an example of a screen displayed on the display portion 23 of the control panel 14. FIG. 6 is a diagram showing an example of the screen that is displayed on the display portion 23 of the control panel 14 when the estimation target date of the amount of electric power to be generated by the solar power generation device 11 is input to the control panel 14. By inputting a chosen date to the control panel 14, communication is performed between the control panel 14 and the electric power generation amount estimation device 100, and the electric power generation amount estimation device 100 calculates an estimated amount of electric power to be generated by the solar power generation device 11 on the date that is input to the control panel 14.

FIG. 7 is a diagram showing a display example on the display portion 23 of the control panel 14, and the display example indicates the estimated amount of electric power to be generated by the solar power generation device 11, which is calculated by the electric power generation amount estimation device 100. Since the estimated amount of electric power to be generated by the solar power generation device 11 is displayed on the display portion 23 of the control panel 14 as shown in FIG. 7, the user can know the estimated amount of electric power to be generated by the solar power generation device 11. As a result, based on the estimated amount of electric power to be generated, the user can make an electric power selling plan for the electric power stored in the battery 13, or can make an electric power generation plan by the home electric generator 15.

Note that, in addition to the information about the estimated amount of electric power to be generated by the solar power generation device 11, an actual value of the amount of electric power consumed in the past by each of the devices in the household, or information about an estimated amount of electric power to be consumed on the estimation target date may be displayed on the control panel 14. By displaying the information about the amount of electric power consumed in the past or that will be consumed in the future by each of the devices, it is possible to more effectively make the electric power selling plan for the electric power stored in the battery 13, or to more effectively make the electric power generation plan by the home electric generator 15. Note that estimation processing of the amount of electric power consumption can be performed based on an actual value of the amount of electric power consumed in the past by each of the devices in the household. When the estimation is performed, information, such as whether the target date is a weekday or a holiday, whether or not there are visitors, and if there are visitors, what kind of visitors (how many adults or how many children) come during which period of time may be taken into account. Further, these pieces of information may be used to automatically calculate and automatically process the electric power generation plan by the home electric generator 15 or an electric power buying plan from the electric power company 3.

2. Conclusion

As described above, according to the embodiment of the present invention, when the estimated amount of electric power to be generated by the solar power generation device is calculated by the electric power generation amount estimation device 100, the position of the solar power generation device and the installation conditions of the solar power generation device are identified from the three-dimensional map information, and the amount of sunlight in the position of the identified solar power generation device is estimated. Then, these pieces of information are used to calculate the estimated amount of electric power to be generated by the solar power generation device. Thus, the electric power generation amount estimation device 100 can more accurately calculate the estimated amount of electric power to be generated. In each household, various types of control can be performed by using the information about the amount of electric power to be generated by the solar power generation device 11 that is estimated by the electric power generation amount estimation device 100.

Note that, the series of processing described in this specification can be performed by either hardware or software, or by a combination of both. In a case where the processing is performed by software, a program in which a processing sequence is recorded can be executed by installing the program in a memory in a computer incorporated in a dedicated hardware. Alternatively, the program can be executed by installing it in a general purpose computer that can execute various types of processing. For example, the program can be recorded in advance in a recording medium. Not only can the program be installed on the computer from the recording medium, but also the program can be received via a network, such as a local area network (LAN) or the Internet, and installed in a recording medium such as an incorporated hard disk.

It should be understood by those skilled in the art that various modifications, combinations, sub-combinations and alterations may occur depending on design requirements and other factors insofar as they are within the scope of the appended claims or the equivalents thereof.

For example, in the above-described embodiment, each household connects to the electric power generation amount estimation device 100 via the Internet 5. However, the present invention is not limited to this example. For example, the electric power generation amount estimation device that estimates the amount of electric power to be generated by the solar power generation device may be provided in each household. In this case, the three-dimensional map information storage portion, in which the three-dimensional map information is stored, may be connected via the Internet or the like to the electric power generation amount estimation device provided in each household.

The present application contains subject matter related to that disclosed in Japanese Priority Patent Application JP 2009-278788 filed in the Japan Patent Office on Dec. 8, 2009, the entire content of which is hereby incorporated by reference.

What is claimed is:

1. An electric power generation amount estimation device, comprising:
circuitry configured to:
identify a solar power generation device that is installed in an area, the solar power generation device being configured to generate electric power by receiving irradiation of sunlight;
estimate and calculate an amount of sunlight;
calculate an amount of electric power to be generated by the solar power generation device installed in the area, based on information about the solar power generation device identified by the circuitry and information about the amount of sunlight calculated by the circuitry;
store three-dimensional map information relating to installation conditions of the solar power generation device, the three-dimensional map including the area, and the three-dimensional map information including information describing objects near the solar power generation device that block sunlight to the solar power generation device under certain conditions;
wherein the circuitry calculates the amount of electric power to be generated by the solar power generation device installed in the area, taking into consideration a condition of blocking sunlight to the solar power generation device by the objects near the solar power generation device, the blocking condition being derived from the orbit of the sun on the estimation target date and from the three-dimensional map information stored in the circuitry, and changing due to the orbit of the sun, and
wherein the three-dimensional map information includes photo data taken from above the area, and the circuitry identifies an actual position in the area of the solar power generation device where the solar power generation device is installed based on the photo data included in the three-dimensional map information through image recognition processing of the photo data by recognizing, in the photo data, the solar power generation device installed in the area, and
issue a command to adjust the amount of electric power to be generated by the solar power generation device based on the calculated amount of electric power to be generated by the solar power generation device.

2. The electric power generation amount estimation device according to claim 1, wherein the circuitry identifies the installation conditions of the solar power generation device based on the three-dimensional map information stored in the circuitry, and the circuitry calculates the amount of sunlight based on the installation conditions of the solar power generation device identified by the circuitry.

3. The electric power generation amount estimation device according to claim 1, wherein the circuitry calculates the amount of electric power to be generated by the solar power generation device, taking into consideration an orbit of the sun on an estimation target date.

4. The electric power generation amount estimation device according to claim 1, wherein the circuitry estimates and calculates the amount of sunlight based on information of a weather forecast.

5. The electric power generation amount estimation device according to claim 4, wherein when the circuitry acquires a most recent weather forecast, the circuitry re-calculates the amount of sunlight based on the acquired weather forecast, and the circuitry re-calculates, based on the re-calculated amount of sunlight, the amount of electric power to be generated.

6. The electric power generation amount estimation device according to claim 1, wherein the circuitry calculates the amount of electric power to be generated, by performing multiplication using a power generation efficiency of the solar power generation device that is a calculation target of the amount of electric power to be generated.

7. The electric power generation amount estimation device according to claim 6, wherein the circuitry calculates the power generation efficiency of the solar power generation device in accordance with time from an installation date of the solar power generation device.

8. The electric power generation amount estimation device according to claim 1, wherein the circuitry calculates a total amount of electric power to be generated by solar power generation devices included in a predetermined area.

9. The electric power generation amount estimation device according to claim 1, wherein the circuitry stores a height and a position of the objects near the solar power generation device, and the circuitry calculates the blocking condition based on the orbit of the sun on the estimation target date and the height and the position of the objects near the solar power generation device.

10. The electric power generation amount estimation device according to claim 1, wherein the calculated amount of electric power to be generated by the solar power generation device installed in the area is used to control other devices.

11. The electric power generation amount estimation device according to claim 1, wherein the circuitry transmits the calculated amount of electric power to be generated by the solar power generation device installed in the area to control other devices.

12. An electric power generation amount estimation system, comprising:
   a sunlight amount estimation device that estimates an amount of sunlight; and
   an electric power generation amount calculation device that calculates an amount of electric power to be generated by a solar power generation device that is installed in an area, the solar power generation device being configured to generate electric power by receiving irradiation of sunlight,
   wherein the sunlight amount estimation device includes first circuitry configured to:
      estimate the amount of sunlight based on a command from the electric power generation amount calculation device, and
      transmit information about the estimated amount of sunlight to the electric power generation amount calculation device, and
   wherein the electric power generation amount calculation device includes second circuitry configured to:
      identify the solar power generation device that is installed in the area,
      notify the sunlight amount estimation device of a command to estimate the amount of sunlight,
      store three-dimensional map information relating to installation conditions of the solar power generation device, the three-dimensional map including the area, and the three-dimensional map information including information describing objects near the solar power generation device that block sunlight to the solar power generation device under certain conditions,
      calculate the amount of electric power to be generated by the solar power generation device installed in the area, based on information about the solar power generation device identified by the second circuitry and information about the amount of sunlight estimated by the first circuitry, and
      calculate the amount of electric power to be generated by the solar power generation device installed in the area, taking into consideration a condition of blocking sunlight to the solar power generation device by the objects near the solar power generation device, the blocking condition being derived from the orbit of the sun on the estimation target date and from the three-dimensional map information stored in the second circuitry, and changing due to the orbit of the sun,
   wherein the three-dimensional map information includes photo data taken from above the area, and the second circuitry identifies an actual position in the area of the solar power generation device where the solar power generation device is installed based on the photo data included in the three-dimensional map information through image recognition processing of the photo data by recognizing, in the photo data, the solar power generation device installed in the area, and
   issue a command to adjust the amount of electric power to be generated by the solar power generation device based on the calculated amount of electric power to be generated by the solar power generation device.

13. The electric power generation amount estimation system according to claim 12, wherein the second circuitry stores a height and a position of the objects near the solar power generation device, and the second circuitry calculates the blocking condition based on the orbit of the sun on the estimation target date and the height and the position of the objects near the solar power generation device.

14. An electric power generation amount estimation method, comprising:
   identifying a solar power generation device that is installed in an area, the solar power generation device being configured to generate electric power by receiving irradiation of sunlight;
   estimating and calculating an amount of sunlight;
   storing three-dimensional map information relating to installation conditions of the solar power generation device, the three-dimensional map including the area, and the three-dimensional map information including information describing objects near the solar power generation device that block sunlight to the solar power generation device under certain conditions;
   calculating, using circuitry, an amount of electric power to be generated by the solar power generation device installed in the area, based on information about the solar power generation device identified in the identifying and information about the amount of sunlight calculated in the estimating, taking into consideration a condition of blocking sunlight to the solar power generation device by the objects near the solar power generation device, the blocking condition being derived from the orbit of the sun on the estimation target date and from the three-dimensional map information, and changing due to the orbit of the sun,
   wherein the three-dimensional map information includes photo data taken from above the area, and the identifying includes identifying an actual position in the area of the solar power generation device where the solar power generation device is installed based on the photo data included in the three-dimensional map information through image recognition processing of the photo data by recognizing, using the circuitry, in the photo data, the solar power generation device installed in the area, and
   issuing a command to adjust the amount of electric power to be generated by the solar power generation device based on the calculated amount of electric power to be generated by the solar power generation device.

15. The electric power generation amount estimation method according to claim 14, wherein the storing includes storing a height and a position of the objects near the solar power generation device, and the calculating the amount of electric power includes calculating the blocking condition based on the orbit of the sun on the estimation target date and the height and the position of the objects near the solar power generation device.

16. A non-transitory computer readable medium encoded with computer program comprising instructions that command a computer to perform a method comprising:
   identifying a solar power generation device that is installed in an area, the solar power generation device being configured to generate electric power by receiving irradiation of sunlight;
   estimating and calculating an amount of sunlight;
   storing three-dimensional map information relating to installation conditions of the solar power generation device, the three-dimensional map including the area, and the three-dimensional map information including information describing objects near the solar power generation device that block sunlight to the solar power generation device under certain conditions;

calculating an amount of electric power to be generated by the solar power generation device installed in the area, based on information about the solar power generation device identified in the identifying and information about the amount of sunlight calculated in the estimating, taking into consideration a condition of blocking sunlight to the solar power generation device by the objects near the solar power generation device, the blocking condition being derived from the orbit of the sun on the estimation target date and from the three-dimensional map information, and changing due to the orbit of the sun, wherein the three-dimensional map information includes photo data taken from above the area, and the identifying includes identifying an actual position in the area of the solar power generation device where the solar power generation device is installed based on the photo data included in the three-dimensional map information through image recognition processing of the photo data by recognizing, in the photo data, the solar power generation device installed in the area, and issuing a command to adjust the amount of electric power to be generated by the solar power generation device based on the calculated amount of electric power to be generated by the solar power generation device.

17. The non-transitory computer readable medium according to claim 16, wherein the storing includes storing a height and a position of the objects near the solar power generation device, and the calculating the amount of electric power includes calculating the blocking condition based on the orbit of the sun on the estimation target date and the height and the position of the objects near the solar power generation device.

* * * * *